United States Patent
Weissberger et al.

(10) Patent No.: US 7,123,616 B2
(45) Date of Patent: Oct. 17, 2006

(54) DETERMINING ROUND-TRIP TIME DELAY

(75) Inventors: Joel Weissberger, Northridge, CA (US); Mark MacWhirter, Simi Valley, CA (US); Manley Klassen, Ventura, CA (US); Errol Ginsberg, Malibu, CA (US)

(73) Assignee: IXIA, Calabasas, CA (US)

( * ) Notice: Subject to any disclaimer, the term of this patent is extended or adjusted under 35 U.S.C. 154(b) by 184 days.

(21) Appl. No.: 10/899,682

(22) Filed: Jul. 27, 2004

(65) Prior Publication Data

US 2004/0264434 A1    Dec. 30, 2004

Related U.S. Application Data

(63) Continuation of application No. 09/591,080, filed on Jun. 9, 2000.

(51) Int. Cl.
*H04L 12/28* (2006.01)
*H04L 12/56* (2006.01)

(52) U.S. Cl. .................. 370/389; 370/252; 709/246; 709/224

(58) Field of Classification Search ............... 370/389, 370/503, 504, 505, 506, 507, 517, 519, 229, 370/230, 231, 232, 235, 236, 395.1, 401, 370/252; 709/246, 224
See application file for complete search history.

(56) References Cited

U.S. PATENT DOCUMENTS

| | | | |
|---|---|---|---|
| 5,343,463 A | 8/1994 | van Tetering et al. | |
| 5,450,394 A | 9/1995 | Gruber | |
| 5,477,531 A | 12/1995 | McKee | |
| 5,600,632 A | 2/1997 | Schulman | |
| 5,878,032 A | 3/1999 | Mirek et al. | |
| 6,148,051 A | 11/2000 | Fujimori et al. | |
| 6,172,989 B1 | 1/2001 | Yanagihara et al. | |
| 6,233,256 B1 | 5/2001 | Dieterich et al. | |
| 6,252,891 B1 | 6/2001 | Perches | |
| 6,336,192 B1 | 1/2002 | Sakamoto | |
| 6,360,332 B1 | 3/2002 | Weinberg | |
| 6,363,056 B1 | 3/2002 | Beigi et al. | |
| 6,446,121 B1 | 9/2002 | Shah | |
| 6,545,979 B1 | 4/2003 | Poulin | |
| 6,557,110 B1 | 4/2003 | Sakamoto | |
| 6,601,098 B1 | 7/2003 | Case et al. | |
| 6,952,401 B1 * | 10/2005 | Kadambi et al. ........... 370/232 |

* cited by examiner

*Primary Examiner*—Ajit Patel
(74) *Attorney, Agent, or Firm*—SoCal IP Law Group; Mark Andrew Goldstein; Steven C. Sereboff

(57) ABSTRACT

A method of and an apparatus for determining real-time data latency are disclosed. The method may include creating a plurality of outgoing data packets having an outgoing time stamp and a group identifier. The outgoing data packets may be transmitted onto a network. A plurality of incoming data packets may be received over the network. For each of the incoming data packets, a round-trip time delay for the incoming data packet may be calculated. Statistics for the incoming data packets may be updated based on the round-trip time delay and the group identifier included in the incoming data packet. The method may be implemented on an apparatus.

24 Claims, 6 Drawing Sheets

DETERMINING ROUND-TRIP TIME DELAY

RELATED APPLICATION INFORMATION

This application is a continuation of application Ser. No. 09/591,080 filed Jun. 9, 2000 entitled "Determining Round Trip Time Delay," which is incorporated herein by reference.

This application is related to U.S. Pat. No. 6,717,917 filed Jun. 9, 2000 entitled "Method of Determining Real-Time Latency and Apparatus Therefor," which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

This invention relates, in general, to data transmission, and more particularly, to methods of determine time delay for a round-trip transmission of data and apparatuses therefor.

2. Description of Related Art

A user accessing a computer server across a computer network must transmit data across the computer network from the user's computer to the computer server and must also receive data across the computer network from the computer server to the user's computer. Therefore, the user requires fast data transmission rates across the computer network and requires, in particular, fast round-trip data transmission across the computer network. However, as computer networks continuously grow in size and complexity, the data transmission rates associated with the larger and more complex computer networks may decrease. Accordingly, a need exists for a method of determining a time delay for the round-trip transmission of data and an apparatus therefor.

DESCRIPTION OF THE DRAWINGS

The invention will be better understood from a reading of the following detailed description, taken in conjunction with the accompanying drawing figures in which.

For simplicity and clarity of illustration, the same reference numerals in different figures denote the same elements, and descriptions and details of well-known features and techniques are omitted to avoid unnecessarily obscuring the invention.

Furthermore, the terms first, second, third, fourth, and the like in the description and in the claims, if any, are used for distinguishing between similar elements and not necessarily for describing a sequential or chronological order. However, it is understood that the embodiments of the invention described herein are capable of operation in other sequences than described or illustrated herein. It is further understood that the terms so used are interchangeable under appropriate circumstances.

DETAILED DESCRIPTION OF THE INVENTION

Figure 1:
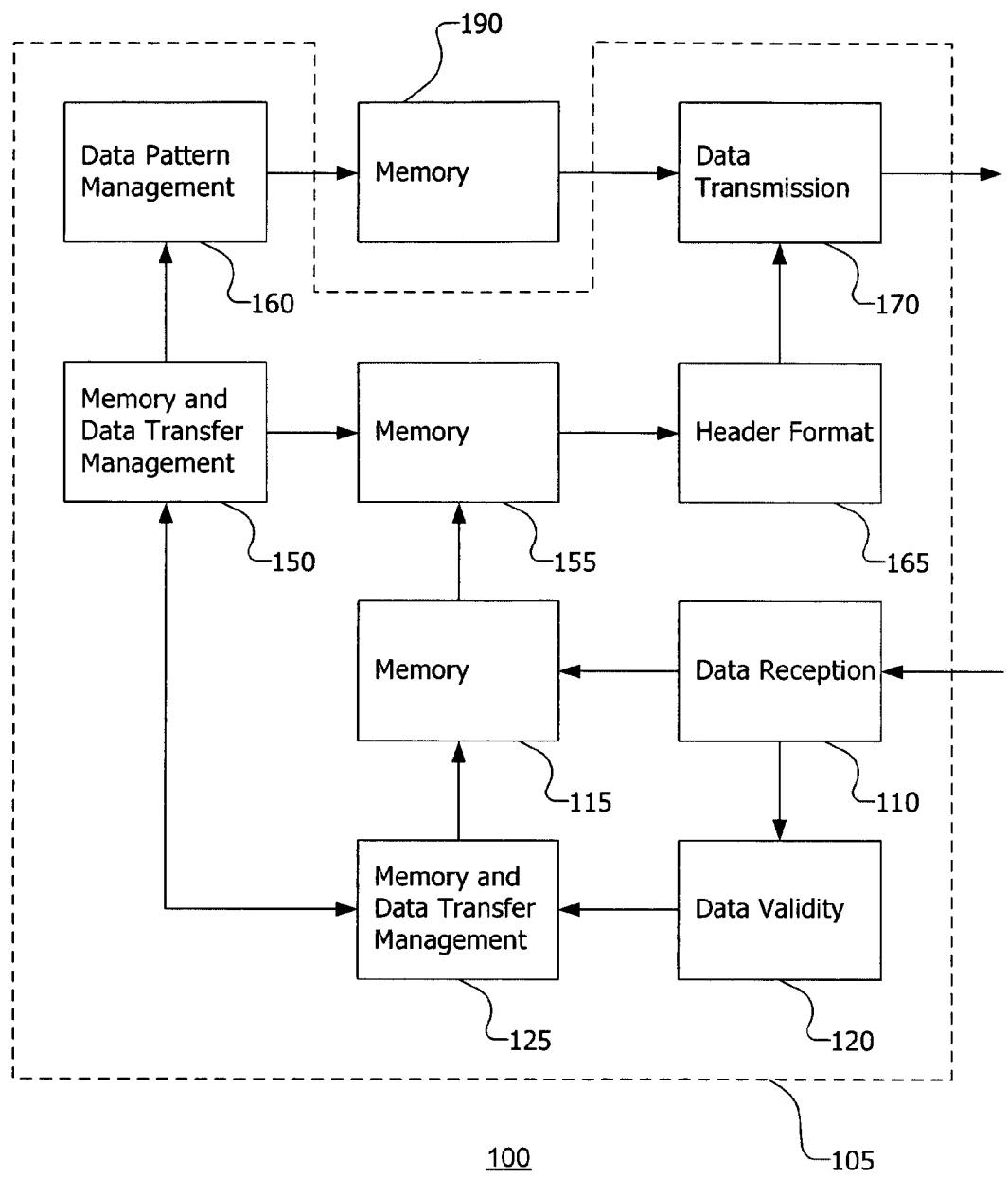
FIG. 1 illustrates a block diagram of an electronic apparatus for determining a time delay of a round-trip transmission of data in accordance with an embodiment of the invention.

FIG. 1 illustrates a block diagram of an electronic device or apparatus 100 for determining a time delay of a round-trip transmission of data. Electronic apparatus 100 comprises an incoming data portion and an outgoing data portion. The incoming data portion includes a data reception portion 110, an input memory portion 115, a data validity portion 120, and, a first memory and data transfer management portion 125. Input memory portion 115 and data validity portion 120 are both coupled to data reception portion 110. Memory and data transfer management portion 125 is coupled to both of input memory portion 115 and data validity portion 120.

The outgoing data portion of electronic apparatus 100 comprises a second memory and data transfer management portion 150, an output memory portion 155, a data pattern management portion 160, a header format portion 165, and a data transmission portion 170. Memory and data transfer management portion 150 is coupled to memory and data transfer management portion 125. Output memory portion 155 is coupled to both of input memory portion 115 and memory and data transfer management portion 150. Data pattern management portion 160 is coupled to memory and data transfer management portion 150 and data transmission portion 170. Header format portion 165 is coupled to output memory portion 155, and data transmission portion 170 is coupled to header format portion 165.

In the preferred embodiment, the incoming and outgoing data portions of electronic apparatus 100 are formed within a single field-programmable gate array (FPGA), as indicated by a dashed line 105. For example, memory portions 115, 155, memory and data transfer management portions 125, 150, data validity portion 120, data reception portion 110, data transmission portion 170, header format portion 165, and data pattern management portion 160 can be located within the single FPGA.

Electronic apparatus 100 further comprises a data pattern memory portion 190 coupling data pattern management portion 160 to data transmission portion 170. In the preferred embodiment, data pattern memory portion 190 is not included in the FPGA. Instead, data pattern memory portion 190 is a preferably a separate dynamic random access memory (DRAM).

As a brief overview of the operation of electronic apparatus 100, data reception portion 110 receives an incoming data packet or frame, and data validity portion 120 validates the incoming data packet. Input memory portion 115 receives a portion of the incoming data packet from data reception portion 110, and input memory portion 115 stores the portion of the incoming data packet. The portion of the incoming data packet comprises, among other items, an Internet Protocol (IP) source address, an IP destination address, a Transport Control Protocol (TCP) source port, a TCP destination port, and a time stamp. Memory and data transfer management portions 125, 150 interact or cooperate to manage a transfer of the stored portions of the incoming data packet from input memory portion 115 to output memory portion 155. Output memory portion 155 receives the portion of the incoming data packet from input memory portion 115, and output memory portion 155 stores the portion of the incoming data packet. Header format portion 165 takes the portion of the incoming data packet and inserts it into an outgoing data packet transmitted out of electronic apparatus 100 through data transmission portion 170. Data pattern management portion 160 manages an insertion of a data pattern from data pattern memory portion 190 into the outgoing data packet from data transmission portion 170. The operation of electronic apparatus 100 is described in more detail with reference to FIGS. 2 through 6.

Figure 2:
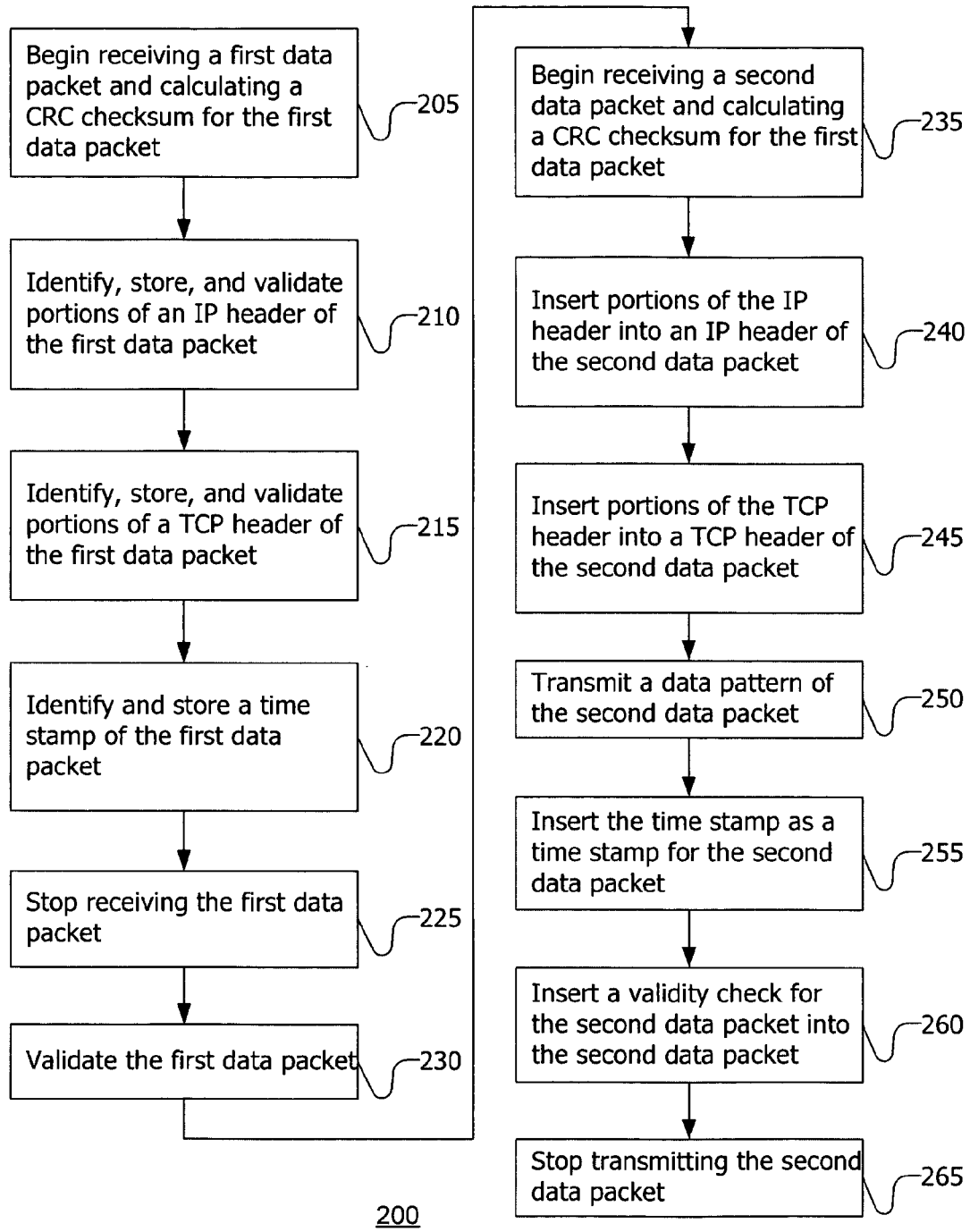
FIG. 2 illustrates a flow chart for a method of determining a time delay for a round-trip transmission of data in accordance with an embodiment of the invention.

FIG. 2 illustrates a flowchart for a method 200 of determining a time delay for a round-trip transmission data. A first electronic device or apparatus transmits a first data packet at a first time where the first electronic apparatus has a first IP source address and a first TCP source port. In the preferred embodiment, the first data packet comprises the first IP source address, a first IP destination address, a first IP checksum, the first TCP source port, a first TCP destination port, a first set of six TCP flags, a first TCP checksum, a first data pattern, a first time stamp indicating the first time when the first data packet was transmitted from the first electronic apparatus, and a first Checklist Redundancy Check (CRC) checksum. A second electronic device or apparatus, such as electronic apparatus 100 of FIG. 1 waits for the first data packet. The second electronic apparatus has the first IP destination address and the first TCP destination port.

At a step 205 of method 200 in FIG. 2, the second electronic apparatus begins to receive the first data packet transmitted from the first electronic apparatus. Upon beginning to receive the first data packet, the second electronic apparatus checks a status of a first memory portion within the second electronic apparatus. As an example, referring back to FIG. 1, as data reception portion 110 begins to receive the first data packet, memory and data transfer management portion 125 checks the status of input memory portion 115. If the status of input memory portion 115 is full, then method 200 (FIG. 2) terminates or starts over by waiting for a new data packet and begins receiving the new data packet at step 205 (FIG. 2). However, if the status of input memory portion 115 is empty or if input memory portion 115 has enough empty memory to store desired portions of the first data packet, then data reception portion 110 begins identifying different portions of the first data packet while receiving the first data packet. In the preferred embodiment, input memory portion 115 is large enough to store the desired portions of two data packets. Electronic apparatus 100 stores the identified portions of the first data packet within input memory portion 115 while receiving the first data packet. Data validity portion 120 validates the different portions of the first data packet while electronic apparatus 100 receives the different portions of the first data packet.

Returning to FIG. 2, step 205 of method 200 also begins the calculation of a CRC checksum for the first data packet. This calculation begins with the first byte of data of the first data packet and preferably starts upon receiving the first byte of data of the first data packet. Next, steps 210, 215, and 220 of method 200 briefly describe the identifying, storing, and validating steps described in the previous paragraph. At step 210, the second electronic apparatus identifies, stores, and validates portions of an IP header of the first data packet, and at a step 215, the second electronic apparatus identifies, stores, and validates portions of a TCP header of the first data packet. At step 220, the second electronic apparatus identifies and stores the time stamp of the first data packet. Steps 210 and 215 are described in more detailed hereinafter with respect to FIGS. 3 and 4, respectively.

At a step 225 of method 200, the second electronic apparatus stops receiving the first data packet. Then, at a step 230, the second electronic apparatus validates the entire first data packet based on a CRC checksum match. As an example, the second electronic apparatus can perform step 230 by comparing the calculated and received CRC checksums. If the calculated and received CRC checksums are not equal to each other, then method 200 terminates or starts over by waiting for a new data packet and begins receiving the new data packet at step 205. However, if the calculated and received CRC checksums are equal to each other, then method 200 continues such that the second electronic apparatus sets or changes the status of the first memory portion storing the portions of the first data packet from empty to full.

Then, the second electronic apparatus checks a status of a second memory portion within the second electronic apparatus. If the status of the second memory portion is full, then the second electronic apparatus waits until at least a portion of the second memory potion is free, is empty, or otherwise becomes available. This portion of the second memory portion needs to be large enough to store the portions of the first data packet currently stored in the first memory portion. After the portion of the second memory becomes available, the second electronic apparatus transfers the stored portions of the first data packet from the first memory portion to the second memory portion. Then, the second electronic apparatus sets or changes the status of the second memory portion from empty to full, and the second electronic apparatus also sets or changes the status of the first memory portion from full to empty. As an example, referring back to FIG. 1, memory and data transfer management portions 125, 150 cooperate or interact to transfer the stored portions of the first data packet from input memory portion 115 to output memory portion 155. In the preferred embodiment, steps 210, 215, and 220 in FIG. 2 are performed in real-time while simultaneously receiving the first data packet.

Returning to FIG. 2, method 200 continues at a step 235 where the second electronic apparatus begins transmitting a second data packet back to the first electronic apparatus. Step 235 of method 200 also begins the calculation of a CRC checksum for the second data packet. This calculation begins with the first byte of data of the second data packet. At a step 240, the second electronic apparatus inserts the stored portions of the IP header of the first data packet into an IP header of the second data packet, and at a step 245, the second electronic apparatus inserts the stored portions of the TCP header of the first data packet into a TCP header of the second data packet. As an example, header format portion 165 (FIG. 1), output memory portion 155 (FIG. 1), and data transmission portion 170 (FIG. 1) can perform steps 240 and 245 in FIG. 2. Steps 240 and 245 are described in more detailed hereinafter with respect to FIGS. 5 and 6, respectively.

Returning back to FIG. 2, at a step 250 of method 200, the second electronic apparatus sends or transmits a second data pattern as part of the second data packet. The second data pattern of the second data packet can be the same as or different from the first data pattern in the first data packet. As an example, data pattern management portion 160 (FIG. 1), data pattern memory portion 190 (FIG. 1), and data transmission portion 170 (FIG. 1) can perform step 250.

Subsequently, at a step 255 of method 200, the second electronic apparatus inserts the first time stamp of the first data packet stored in the second memory portion as a second time stamp in the second data packet. Next, at a step 260, the second electronic apparatus inserts a validity check for the second data packet into the second data packet. As an example, the validity check is a second CRC checksum that is different from the first CRC checksum of the first data packet. In the preferred embodiment, header format portion 165 (FIG. 1), output memory portion 155 (FIG. 1), and data transmission portion 170 (FIG. 1) perform steps 255 and 260. Subsequently, at a step 265 of method 200, the second electronic apparatus stops transmitting the second data packet. In the preferred embodiment, steps 240, 245, 250, 255, and 260 are performed in real-time while simultaneously transmitting the second data packet.

Next, the first electronic apparatus receives the second data packet at a second time. This second time occurs after the first time at which the first electronic apparatus originally transmitted the first data packet to the second electronic apparatus. The first electronic apparatus determines the time delay for the round-trip transmission of data from the first electronic apparatus to the second electronic apparatus and back to the first electronic apparatus by subtracting the time indicated by the second time stamp in the second data packet from the second time. As indicated earlier at step 255, the second time stamp in the second data packet contains the first time at which the first electronic apparatus transmitted the first data packet.

Figure 3:
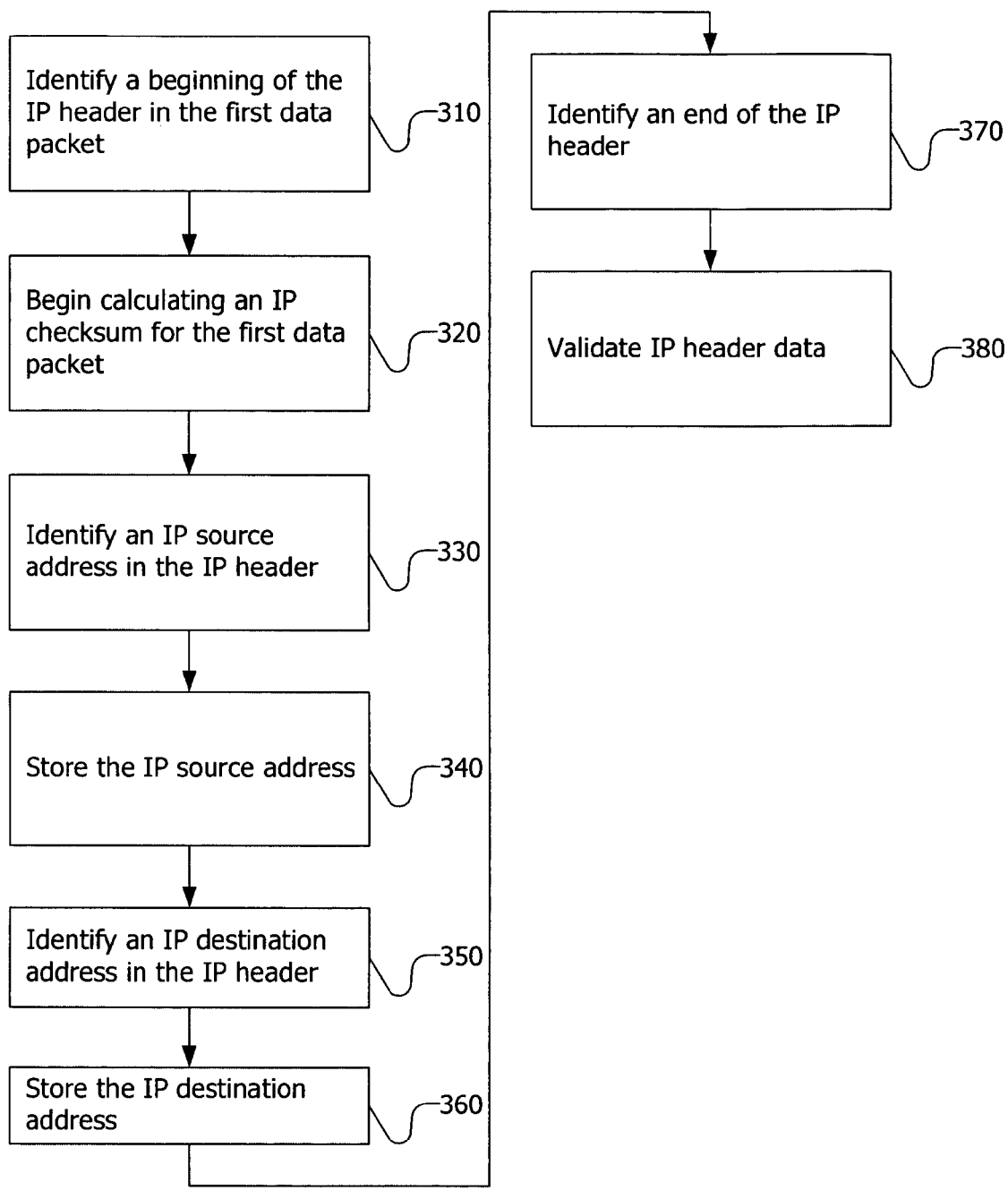
FIGS. 3 through 6 illustrate flow charts of detailed portions of the method of FIG. 2 in accordance with an embodiment of the invention.

FIG. 3 illustrates a flowchart of substeps within step 210 of FIG. 2. At a step 310 in FIG. 3, the second electronic apparatus identifies a beginning of the IP header in the first data packet, and at a step 320, the second electronic apparatus begins calculating an IP checksum for the first data packet. At a step 330, the second electronic apparatus identifies an IP source address within the IP header of the first data packet, and at a step 340, the second electronic apparatus stores the first IP source address. Then, at a step 350, the second electronic apparatus identifies an IP destination address in the IP header of the first data packet, and at a step 360, the second electronic apparatus stores the IP destination address. Next, at a step 370, the second electronic apparatus identifies an end of the IP header, and, at a step 380, the second electronic apparatus validates the IP header data of the first data packet based on an IP checksum match.

To perform step 380, the second electronic apparatus finishes calculating the IP checksum for the first data packet and compares the calculated IP checksum to the received IP checksum of the first data packet. If the calculated and received IP checksums are equal to each other, then the IP checksum of the first data packet is valid, and method 200 (FIG. 2) continues with step 215 (FIG. 2). However, if the calculated and received IP checksums are not equal to each other, then method 200 (FIG. 2) terminates or starts over, and the second electronic apparatus waits for another data packet and begins receiving the other data packet at step 205 (FIG. 2). In the preferred embodiment, steps 310, 320, 330, 340, 350, 360, 370, and 380 are performed in real-time while simultaneously receiving the first data packet. Also in the preferred embodiment, the second electronic apparatus identifies and stores the IP source and destination addresses before validating the IP header data.

Figure 4:
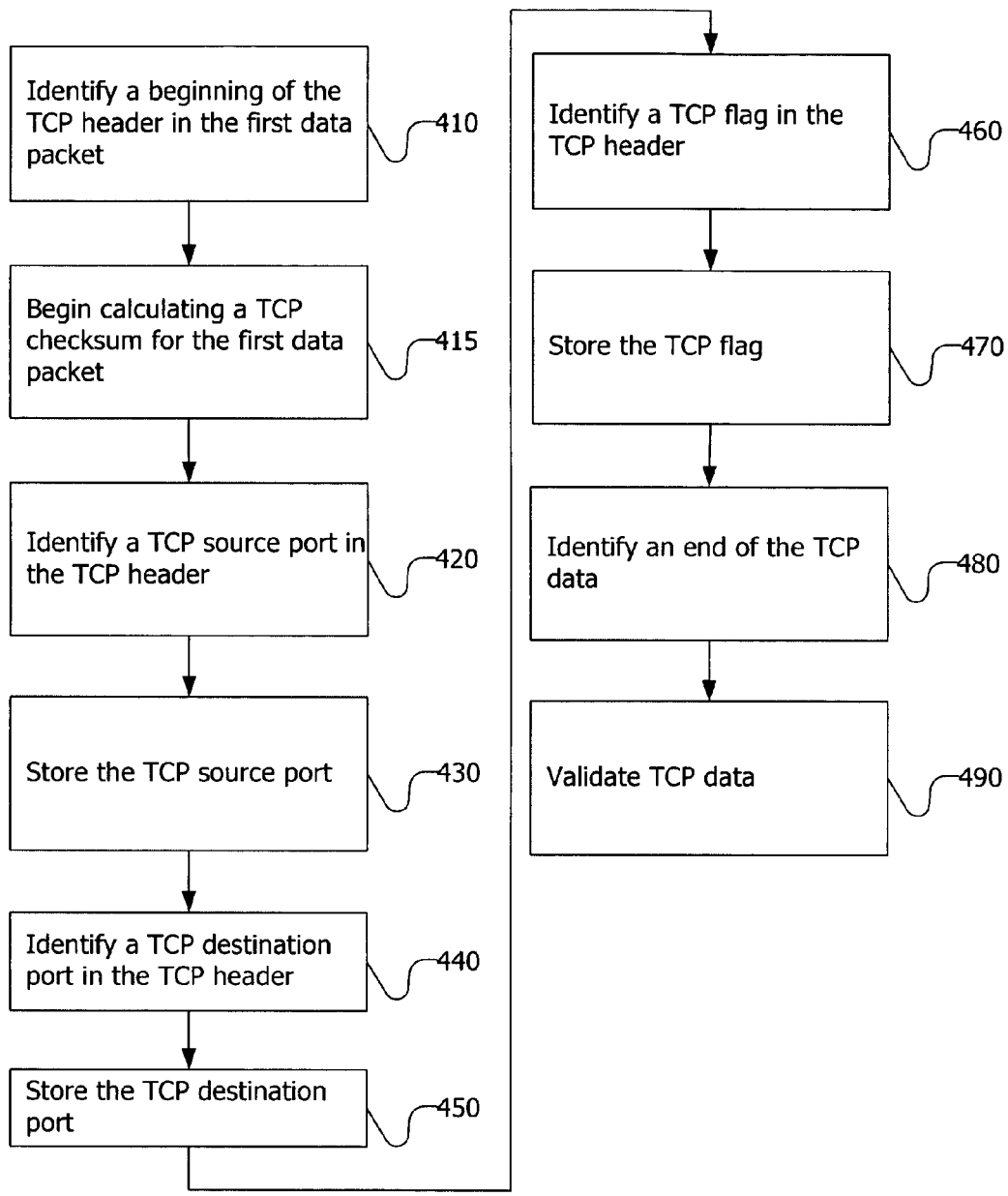

FIG. 4 illustrates a flowchart of the substeps within step 215 of FIG. 2. At a step 410 of FIG. 4, the second electronic apparatus identifies a beginning of the TCP header in the first data packet. Then, at a step 415, the second electronic apparatus begins to calculate a TCP checksum for the first data packet. Next, at a step 420, the second electronic apparatus identifies a TCP source port in the TCP header of the first data packet, and a step 430, the second electronic apparatus stores the TCP source port. At a step 440, the second electronic apparatus identifies a TCP destination port in the TCP header of the first data packet, and at a step 450, the second electronic apparatus stores the TCP destination port. Then, at a step 460, the second electronic apparatus identifies the TCP flags in the TCP header of the first data packet, and at a step 470, the second electronic apparatus stores at least a portion of the TCP flags. In the preferred embodiment, the second electronic apparatus receives six TCP flags in the first data packet, but stores only two of the six TCP flags. In particular, the second electronic apparatus stores the TCP flags identified as a final (FIN) flag and a synchronous (SYN) flag. Next, at a step 480, the second electronic apparatus identifies an end of the TCP data, and at a step 490, the second electronic apparatus validates the TCP data, including the TCP header, in the first data packet based on a TCP checksum match.

As an example, the second electronic apparatus can perform step 490 by comparing the calculated and received TCP checksums. If the calculated and received TCP checksums are equal to each other, then method 200 (FIG. 2) continues with step 220 (FIG. 2). However, if the calculated and received checksums are not equal to each other, then method 200 (FIG. 2) terminates or starts over, and the second electronic apparatus waits to receive another data packet and begins receiving the new data packet at step 205 (FIG. 2). Also in the preferred embodiment, the second electronic apparatus performs steps 410, 420, 430, 440, 450, 460, 470, 480, and 490 in real-time while simultaneously receiving the first data packet. Furthermore, the second electronic apparatus preferably identifies and stores the TCP source and destination ports and the TCP flags before validating the TCP data.

Figure 5:
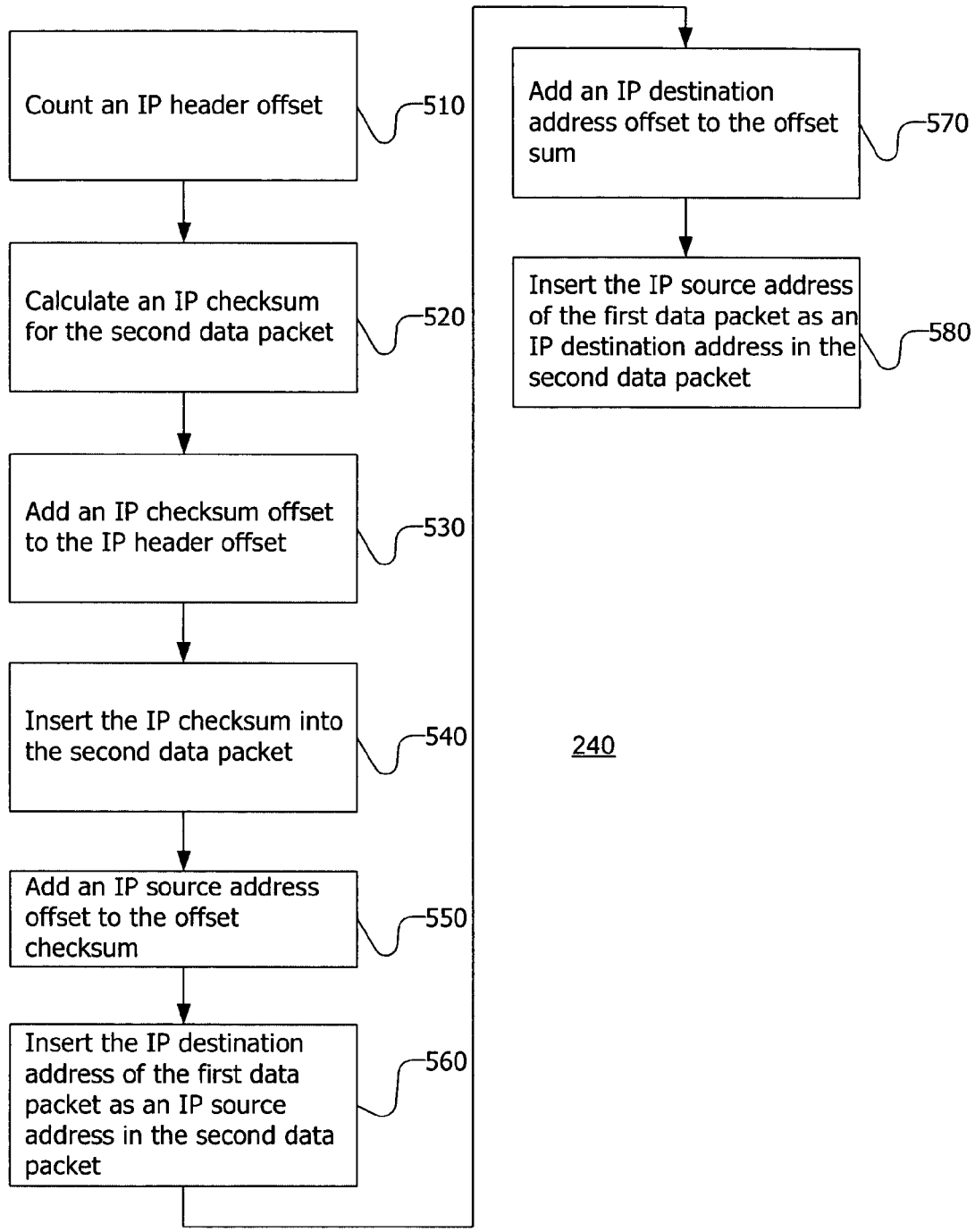

FIG. 5 illustrates a flowchart of the substeps in step 240 of FIG. 2. At a step 510 of FIG. 6, the second electronic apparatus counts an IP header offset, and at a step 520, the second electronic apparatus calculates a second IP checksum for the second data packet. Step 520 can be performed at this time because the portions of the IP header used to calculate IP checksum are already known and stored in the second memory portion. Next, at a step 530, the second electronic apparatus adds an IP checksum offset to the IP header offset, and at a step 540, the second electronic apparatus inserts the calculated IP checksum into the second data packet. Next, at a step 550, the second electronic apparatus adds an IP source address offset to the previous offset sum, and then the second electronic apparatus uses the first IP destination address of the first data packet stored in the second memory portion. In particular, at a step 560, the second electronic apparatus inserts the first IP destination address as a second IP source address in the second data packet.

Then, at a step 570, the second electronic apparatus adds an IP destination address offset to the previous offset sum, and then the second electronic apparatus uses the first IP source address of the first data packet stored in the second memory portion. In particular, at a step 580, the second electronic apparatus inserts the first IP source address as a second IP destination address in the second data packet. In the preferred embodiment, the second electronic apparatus performs steps 520, 530, and 540 before steps 550, 560, 570, and 580. Also in the preferred embodiment, the second electronic apparatus performs steps 510, 520, 530, 540, 550, 560, 570, and 580 in real-time while simultaneously transmitting the second data packet.

Figure 6:
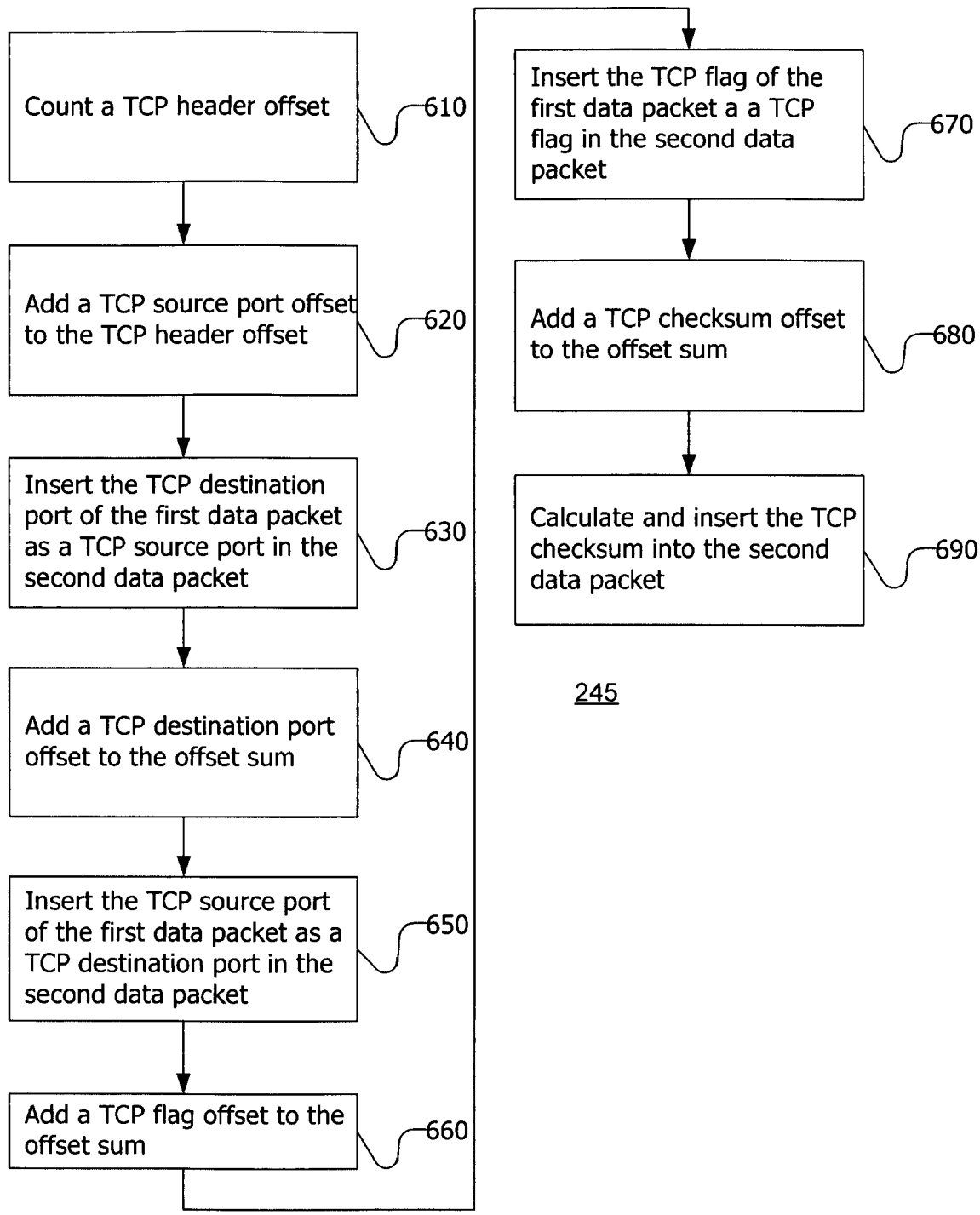

FIG. 6 illustrates a flowchart of the substeps of step 245 in FIG. 2. At a step 610 in FIG. 6, the second electronic apparatus counts a TCP header offset, and at a step 620, the second electronic apparatus adds a TCP source port offset to the TCP header offset. Then, the second electronic apparatus uses the first TCP destination port of the first data packet stored in the second memory portion. In particular, at a step 630, the second electronic apparatus inserts the first TCP destination port as a second TCP source port in the second data packet. Next, at a step 640, the second electronic apparatus adds a TCP destination port offset to the previous offset sum, and then the second electronic apparatus uses the first TCP source port of the first data packet stored in the second memory portion. In particular, at a step 650, the second electronic apparatus inserts the first TCP source port as a second TCP destination port in the second data packet.

Subsequently, at a step 660, the second electronic apparatus adds a TCP flag offset to the previous offset sum, and then the second electronic apparatus uses the two TCP flags of the first data packet stored in the second memory portion. In particular, at a step 670, the second electronic apparatus inserts the FIN flag and the SYN flag as a portion of the second TCP flags into the second data packet. The second electronic apparatus also inserts four other TCP flags, for a total of six TCP flags, into the second data packet. In particular, the second electronic apparatus inserts a TCP flag identified as an acknowledgment (ACK) flag where the ACK flag has a value of one. The second electronic apparatus also inserts three other TCP flags, each having a value of zero.

Then, at a step 680, the second electronic apparatus adds a TCP checksum offset to the previous offset sum, and at a step 690, the second electronic apparatus calculates and inserts the second TCP checksum into the second data packet. In the preferred embodiment, the second electronic apparatus component begins and finishes calculating the second TCP checksum after step 680. Also in the preferred embodiment, the second electronic apparatus performs steps 610, 620, 630, 640, 650, 660, and 670 before steps 680 and 690. Furthermore, the second electronic apparatus preferably performs steps 610, 620, 630, 640, 650, 660, 670, 680, and 690 in real-time while simultaneously transmitting the second data packet.

Therefore, an improved method of determining a time delay for the round-trip transmission of data and an apparatus therefor are provided to overcome the disadvantages of the prior art. The method and apparatus enable the detection of an increase or decrease in the time delay for the round-trip transmission of data across a computer network.

Although the invention has been described with reference to specific embodiments, it will be understood by those skilled in the art that various changes may be made without departing from the spirit or scope of the invention. For instance, the numerous details set forth herein such as, for example, the specific sequence of steps are provided to facilitate the understanding of the invention and are not provided to limit the scope of the invention. Furthermore, the method described herein is not limited to the round-trip transmission of data between two electronic devices. Instead, the method can be modified and applied to the round-trip or non-round-trip transmission of data between three or more electronic devices. Accordingly, the disclosure of embodiments of the invention is intended to be illustrative of the scope of the invention and is not intended to be limiting. It is intended that the scope of the invention shall be limited only to the extent required by the appended claims.

It is claimed:

1. A method of determining a time delay for a round-trip transmission of data comprising:
   transmitting a first plurality of data packets, each having a first packet group identification (PGID) and a time stamp
   receiving a set of data packets
   identifying PGIDs in the set of data packets
   identifying time stamps in each of the data packets in the set of data packets;
   using the time stamps to determine time delays for each of the data packets in the set of data packets
   summing a number of data packets in the set of data packets having the first PGID to create a first total count
   summing the time delays of the set of data packets having the first PGID to create a first total time delay
   updating a set of statistics based on at least the first total count and the first total time delay.

2. The method of claim 1 further comprising:
   comparing the time delays of each of the data packets in the set of data packets having the first PGID to a first minimum time delay
   storing a time delay of a first data packet of the set of data packets having the first PGID as the first minimum time delay if the time delay of the first data packet of the set of data packets is less than the first minimum time delay
   comparing the time delays of each of the data packets set of data packets having the first PGID to a first maximum time delay
   storing a time delay of a second data packet of the set of data packets having the first PGID as the first maximum time delay if the time delay of the second data packet of the set of data packets is greater than the first maximum time delay.

3. The method of claim 2 wherein the set of statistics is further based on at least one of the first maximum time delay and the first minimum time delay.

4. The method of claim 1 further comprising:
   locating a signature at a signature offset in the first plurality of data packets
   comparing signatures in the set of data packets to the signature of the first plurality of data packets
   rejecting a first data packet of the set of data packets if a signature of the first data packet of the set of data packets fails to match the signature of the first plurality of data packets.

5. The method of claim 1 wherein the time stamps in the set of data packets originate from the time stamps in the first plurality of data packets.

6. The method of claim 1 further comprising:
   checking a validity of the set of data packets; and
   rejecting a first data packet of the set of data packets if the first data packet is invalid.

7. The method of claim 6 wherein the checking comprises:
   evaluating cyclic redundancy check values in the set of data packets.

8. The method of claim 6 wherein the checking comprises:
   determining whether sizes of the set of data packets are within a predetermined range.

9. The method of claim 1 further comprising:
determining a first average time delay by dividing the first total time delay by the first total count.

10. A method for determining in real-time a round-trip time delay for data packets comprising:
creating a plurality of outgoing data packets having an outgoing time stamp and a group identifier
transmitting the outgoing data packets onto a network
receiving a plurality of incoming data packets over the network
calculating a round-trip time delay for each of the incoming data packets
updating statistics for the incoming data packets based on the round-trip time delay and the group identifier included in the incoming data packets.

11. The method of claim 10 further comprising:
determining whether each of the incoming data packets is valid by evaluating whether a cyclic redundancy check value in each of the incoming data packets is accurate.

12. The method of claim 10 further comprising:
determining whether each of the incoming data packets is valid by evaluating whether a size of each of the incoming data packets is within a predetermined range.

13. The method of claim 10 further comprising:
determining whether each of the incoming data packets is valid by evaluating whether an incoming signature included in the incoming data packets corresponds to an outgoing signature included in the outgoing data packets.

14. The method of claim 10 wherein the calculating comprises:
subtracting an incoming time-stamp included in the incoming data packets from a time of receipt for the incoming data packets, wherein the incoming time-stamp is a copy of the outgoing time-stamp.

15. The method of claim 10 wherein the updating comprises:
arranging the statistics based on the group identifier included in the incoming data packets.

16. The method of claim 15 wherein the statistics include at least three from the group comprising a minimum round-trip delay, a maximum round-trip delay, a current incoming data packet round-trip delay, an average round-trip delay, a current incoming data packet size, an average incoming data packet size, a minimum incoming data packet size, and a maximum incoming data packet size.

17. The method of claim 10 further comprising
displaying a graphical representation of the statistics.

18. A method for determining a round-trip time delay for data packets comprising:
creating a plurality of outgoing data packets having an outgoing time stamp, a group identifier and validation information
transmitting the outgoing data packets onto a network
receiving a plurality of incoming data packets over the network
validating some of the incoming data packets
for each of the incoming data packets that is valid
calculating a round-trip time delay for the incoming data packet
updating statistics for the incoming data packets based on the round-trip time delay
and the group identifier included in the incoming data packet.

19. The method of claim 18 wherein the validation information comprises at least one from the group comprising a cyclic redundancy check value, a data packet size, and an outgoing signature.

20. The method of claim 18 wherein the calculating comprises:
subtracting an incoming time-stamp included in the incoming data packet from a time of receipt for the incoming data packet, wherein the incoming time-stamp is a copy of the outgoing time-stamp.

21. The method of claim 18 wherein the updating comprises:
preparing the statistics based on the group identifier included in the incoming data packets.

22. The method of claim 18 wherein the statistics include at least three selected from the group comprising a minimum round-trip delay, a maximum round-trip delay, a current incoming data packet round-trip delay, an average round-trip delay, a current incoming data packet size, an average incoming data packet size, a minimum incoming data packet size, and a maximum incoming data packet size.

23. The method of claim 18 further comprising
displaying the statistics.

24. The method of claim 1 wherein the PGIDs are each at least one from the group consisting of an Internet protocol (IP) address, an IP priority, a data packet size, and a protocol mix.

* * * * *